United States Patent
Hasegawa et al.

(10) Patent No.: US 9,203,101 B2
(45) Date of Patent: Dec. 1, 2015

(54) METHOD OF MANUFACTURING FUEL CELL

(75) Inventors: Shigeki Hasegawa, Gotemba (JP); Yoshihiro Shinozaki, Atsugi (JP); Masahiro Imanishi, Gotemba (JP); Seiji Sano, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 13/637,996

(22) PCT Filed: Apr. 12, 2011

(86) PCT No.: PCT/IB2011/000813
§ 371 (c)(1),
(2), (4) Date: Sep. 28, 2012

(87) PCT Pub. No.: WO2011/128760
PCT Pub. Date: Oct. 20, 2011

(65) Prior Publication Data
US 2013/0020280 A1 Jan. 24, 2013

(30) Foreign Application Priority Data
Apr. 13, 2010 (JP) ................. 2010-091928

(51) Int. Cl.
*H01B 13/00* (2006.01)
*C25F 3/00* (2006.01)
(Continued)

(52) U.S. Cl.
CPC .......... *H01M 8/1002* (2013.01); *H01M 4/8605* (2013.01); *H01M 4/8657* (2013.01);
(Continued)

(58) Field of Classification Search
CPC .............. Y02E 60/521; H01M 2008/1095; H01M 4/8605; H01M 4/8657; H01M 4/8846; H01M 4/8878; H01M 4/8892; H01M 8/1002; B82Y 30/00; B82Y 40/00; B01J 29/005; B01J 29/061; B01J 37/0018; C01B 31/0226; C01B 2202/02; C01B 2202/22; C01B 31/0233; C07C 2529/84
USPC .............. 216/106, 13, 95, 103, 104; 977/750, 977/742, 843; 427/115, 147, 255.31
See application file for complete search history.

(56) References Cited

U.S. PATENT DOCUMENTS

| 6,793,738 B2* | 9/2004 | Kool et al. ................. 134/3 |
| 6,890,506 B1 | 5/2005 | Harutyunyan et al. |

(Continued)

FOREIGN PATENT DOCUMENTS

| JP | 2002-298861 A | 10/2002 |
| JP | 2005-004967 A | 1/2005 |

(Continued)

OTHER PUBLICATIONS

Yamamoto et al., "Dissolution of Zeolite in Acidic and Alkaline Aqueous Solutions As Revealed by AFM Imaging", J.Phys Chem. 1996, 100, p. 18474-18482.*

(Continued)

*Primary Examiner* — Nadine Norton
*Assistant Examiner* — Christopher Remavege
(74) *Attorney, Agent, or Firm* — Sughrue Mion, PLLC (57) ABSTRACT

A method of manufacturing a fuel cell includes: growing carbon nanotubes substantially perpendicular to a substrate formed by loading a growth catalyst on a base material; arranging the substrate and a polymer electrolyte membrane so as to oppose to each other and combining the carbon nanotubes with the polymer electrolyte membrane; and dissolving and removing part of the substrate by immersing the substrate in a solution which dissolves the substrate, after the carbon nanotubes and the polymer electrolyte membrane are combined.

6 Claims, 3 Drawing Sheets

(51) Int. Cl.
  *H01M 8/10* (2006.01)
  *H01M 4/86* (2006.01)
  *H01M 4/88* (2006.01)

(52) U.S. Cl.
  CPC .......... *H01M 4/8673* (2013.01); *H01M 4/8814* (2013.01); *H01M 4/8817* (2013.01); *H01M 4/8875* (2013.01); *H01M 4/8878* (2013.01); *H01M 4/886* (2013.01); *H01M 4/8846* (2013.01); *H01M 4/8892* (2013.01); *H01M 2008/1095* (2013.01); *Y02E 60/521* (2013.01)

(56) References Cited

U.S. PATENT DOCUMENTS

| | | | |
|---|---|---|---|
| 7,790,600 B2* | 9/2010 | Jacobs et al. | 438/618 |
| 2004/0224217 A1 | 11/2004 | Toops | |
| 2006/0216221 A1* | 9/2006 | Lee | 423/447.3 |
| 2006/0269827 A1 | 11/2006 | Liu et al. | |
| 2010/0062229 A1* | 3/2010 | Hata et al. | 428/195.1 |
| 2010/0075201 A1 | 3/2010 | Nakanishi et al. | |
| 2011/0027163 A1* | 2/2011 | Shinohara et al. | 423/447.2 |

FOREIGN PATENT DOCUMENTS

| | | |
|---|---|---|
| JP | 2005-203332 A | 7/2005 |
| JP | 2007-257886 A | 10/2007 |
| WO | 2005/035841 A2 | 4/2005 |
| WO | 2008/115753 A2 | 9/2008 |

OTHER PUBLICATIONS

Elizabeth J Biddinger et al: "Nitrogen-Containing Carbon Nanostructures as Oxygen-Reduction Catalysts", Topics in Catalysis, Kluwer Academic Publishers—Plenum Publishers; NE, vol. 52, No. 11, Apr. 28, 2009, pp. 1566-1574, XP019734224, ISSN: 1572-9028, DOI: 10.1007/S11244-009-9289-Y, in English.

International Search Report and Written Opinion for corresponding International Patent Application No. PCT/IB2011/000813 mailed Dec. 8, 2011, in English.

Invitation to Pay Additional Fees and, Where Applicable, Protest Fee for corresponding International Patent Application No. PCT/IB2011/000813 mailed Aug. 16, 2011, in English.

* cited by examiner

METHOD OF MANUFACTURING FUEL CELL

BACKGROUND OF THE INVENTION

1. Field of the Invention

The invention relates to a method of manufacturing a fuel cell. More particularly, the invention relates to a method of manufacturing a fuel cell in which an electrode layer is formed of Carbon NanoTubes (CNTs).

2. Description of Related Art

Japanese Patent Application Publication No. 2007-257886 (JP-A 2007-257886) discloses a method of manufacturing a fuel cell. This method includes the step of (1) growing carbon nanotubes (CNTs) perpendicular to a substrate composed of a catalyst for growing CNTs supported on a base plate and the base plate, (2) hot-pressing the CNTs to a polymer electrolyte membrane, and (3) peeling the substrate from the CNTs. In this method, hot-pressing is carried out with the CNTs and the polymer electrolyte membrane heated to from 140° C. to 160° C. and pressurized to from 2 to 3 MPa.

The CNTs are peeled from the substrate by tearing off the substrate in a direction away from the polymer electrolyte membrane. Hence, when the substrate is peeled off, there is a possibility of the CNTs separating from the polymer electrolyte membrane together with the base material. In light of this, according to JP-A 2007-257886, because pressure is applied at the time of hot-pressing, it is possible to cause the CNTs to become embedded in the polymer electrolyte membrane. Consequently, when the base material is peeled off, the CNTs can be prevented from separating from the polymer electrolyte membrane together with the base material.

However, when pressure is applied to the CNT layer at the time of hot-pressing, the CNTs that was formed in the perpendicular direction sometimes deforms. Also, depending on the degree of pressure applied at the time of hot-pressing, the CNTs sometimes penetrate too deeply into the polymer electrolyte membrane. In cases where the CNTs have penetrated too deeply and passed through the polymer electrolyte membrane, there is a possibility that a leak will arise where the reactant gas passes from one electrode to the other electrode side. This has led at times to a decline in fuel cell performance.

SUMMARY OF THE INVENTION

This invention relates to a method of manufacturing fuel cells which is able to effectively transfer (e.g., hot-pressing) substantially perpendicularly formed CNTs to the polymer electrolyte membrane.

A first aspect of the invention relates to a fuel cell manufacturing method which includes: growing CNTs substantially perpendicular to a substrate formed by loading a growth catalyst on a base material; arranging the substrate and a polymer electrolyte membrane so as to oppose to each other and combining the CNTs with the polymer electrolyte membrane; and dissolving and removing part of the substrate by immersing the substrate in an alkali solution, after the CNTs and the polymer electrolyte membrane are combined.

The base material may include at least one material selected from the group consisting of zeolite, silica, titania, zirconia, aluminum and zinc.

In this way, part of the substrate can be dissolved and removed by immersing the substrate in an alkali solution. The ability for removal by dissolution eliminates the need to apply pressure and embed the CNTs in the polymer electrolyte membrane in order to keep the CNTs from separating from the polymer electrolyte membrane together with the substrate. Therefore, the CNTs can be effectively transferred to the polymer electrolyte membrane while preventing electrical shorts and leaks in a Membrane Electrode Assembly (MEA).

After part of the substrate has been dissolved and removed, an assembly of the CNTs and the polymer electrolyte membrane may be immersed in an acid solution.

In this way, the CNTs and polymer electrolyte membrane which end up containing an alkali component when part of the substrate is dissolved and removed can be neutralized by immersion in an acid solution.

The base material may be composed of a plurality of layers. Of the plurality of layers, a surface layer which is located on a side where CNTs are grown may be formed of zeolite, and a layer which is located inside of the surface layer may be formed of at least one material selected from the group consisting of silica, titania, aluminum and zinc.

The surface layer on the side where CNTs are grown may be formed of zeolite, and the inside layer may be formed of a layer having a higher solubility to an alkali solution than zeolite. In this way, compared to a case in which the base material has been formed of a layer of zeolite alone, the base material dissolution rate can be increased, enabling the lead time when peeling off the substrate to be shortened.

A second aspect of the invention relates to a fuel cell manufacturing method which includes: growing CNTs substantially perpendicular to a substrate formed by loading a growth catalyst on a base material; arranging the substrate and a polymer electrolyte membrane so as to be mutually opposed and combining the CNTs with the polymer electrolyte membrane; and dissolving and removing part of the substrate by immersing the substrate in an acid solution, after the CNTs and the polymer electrolyte membrane are combined.

The base material may include at least one material selected from the group consisting of silica, zirconia, aluminum, zinc, iron, nickel and copper.

Part of the substrate can be dissolved and removed by immersing the substrate in an acid solution. The ability for removal by dissolution eliminates the need to apply pressure and embed the CNTs in the polymer electrolyte membrane in order to keep the CNTs from separating from the polymer electrolyte membrane together with the substrate. Therefore, the CNTs can be effectively transferred to the polymer electrolyte membrane while preventing electrical shorts and leaks in the MEA.

The method may include loading electrode catalysts on the grown carbon nanotubes; and coating an ionomer onto the carbon nanotubes on which the electrode catalysts are loaded.

BRIEF DESCRIPTION OF THE DRAWINGS

The features, advantages, and technical and industrial significance of exemplary embodiments of the invention are described below with reference to the accompanying drawings, in which like numerals denote like elements, and wherein.

DETAILED DESCRIPTION OF EMBODIMENTS

First Embodiment

Fuel Cell Construction

Figure 1:
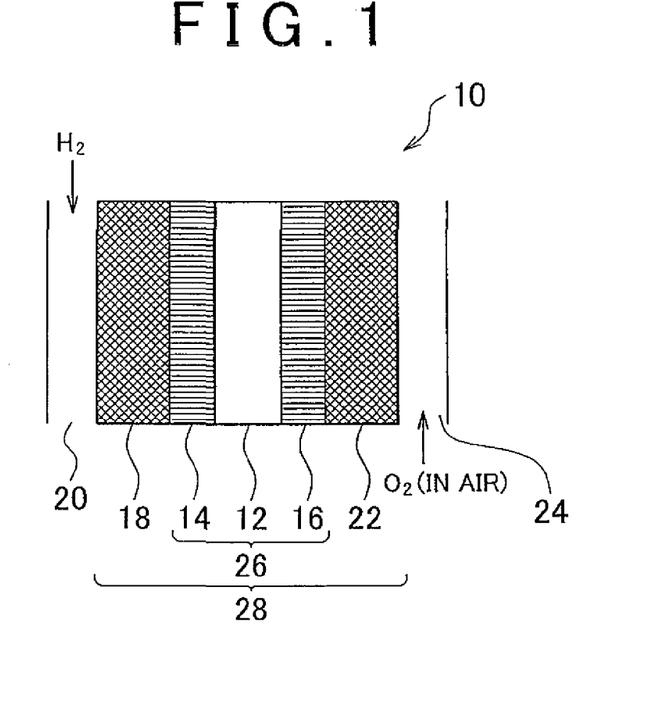
FIG. 1 is a schematic diagram showing the cross-sectional structure of a fuel cell 10 manufactured by the method according to the present embodiment.

FIG. 1 is a schematic cross-sectional diagram showing the construction of a fuel cell 10 manufactured by the method of the present embodiment. Referring to FIG. 1, a fuel cell 10 has a polymer electrolyte membrane 12 on either side of which an anode catalyst layer 14 and a cathode catalyst layer 16 are respectively provided so as to sandwich the polymer electrolyte membrane 12. A gas diffusion layer 18 and a separator 20 are provided in this order outside of the anode catalyst layer 14. A gas diffusion layer 22 and a separator 24 are similarly provided in this order outside of the cathode catalyst layer 16. The polymer electrolyte membrane 12 and the pair of catalyst layers, i.e., the anode catalyst layer 14 and the cathode catalyst layer 16 on either side thereof, together make up a MEA 26.

The polymer electrolyte membrane 12 is a proton exchange membrane which conducts protons from the anode catalyst layer 14 to the cathode catalyst layer 16. The polymer electrolyte membrane 12 is a hydrocarbon-based polymer electrolyte which has been formed into a membrane.

Examples of hydrocarbon-based polymer electrolytes include (i) hydrocarbon-based polymers in which the main chain is composed of an aliphatic hydrocarbon, (ii) polymers in which the main chain is composed of an aliphatic hydrocarbon and some or all of the hydrogen atoms on the main chain have been substituted with fluorine atoms, and (iii) polymers in which the main chain has aromatic rings. Alternatively, a polymer electrolyte having acidic groups may be used as the polymer electrolyte. Examples of the acidic groups include sulfonic acid groups, sulfonimide groups, carboxylic groups, phosphonic acid groups, phosphoric acid groups and phenolic hydroxyl groups. Of these, sulfonic acid groups or phosphonic acid groups is preferred. Sulfonic acid groups are especially preferred.

Illustrative examples of such polymer electrolyte membranes 12 include NAFION® (DuPont), FLEMION® (Asahi Glass Co., Ltd.), ACIPLEX® (Asahi Kasei Chemicals Co., Ltd.) and GORE-SELECT® (Japan Gore-Tex Co., Ltd.).

The anode catalyst layer 14 and the cathode catalyst layer 16 are layers which function substantially as electrode layers in a fuel cell. A catalyst loaded on CNTs is used in both the anode catalyst layer 14 and the cathode catalyst layer 16.

The gas diffusion layers 18 and 22 are electrically conductive, gas-diffusing porous base materials for uniformly diffusing a precursor gas to the respective catalyst layers and suppressing drying of the MEA 26. Illustrative examples of electrically conductive, gas-diffusing porous base materials include carbon-based porous materials such as carbon paper, carbon cloth and carbon felt.

The gas-diffusing porous base material may be formed of a single layer, or it may be formed of two layers by providing a porous layer having a small pore size on the side facing the catalyst layer. In addition, the gas-diffusing porous base material may also be provided with a water-repelling layer facing the catalyst layer. The water-repelling layer generally has a porous structure which includes an electrically conductive particulate material such as carbon particles or carbon fibers, and a water-repelling resin such as polytetrafluoroethylene. Providing such a water-repelling layer makes it possible to increase the ability of the gas diffusion layers 18 and 22 to remove water while at the same time enabling a suitable amount of moisture to be retained within the anode catalyst layer 14, the cathode catalyst layer 16 and the polymer electrolyte membrane 12. In addition, electrical contact between the anode catalyst layer 14 and cathode catalyst layer 16 and the gas diffusion layers 18 and 22 can be improved. The gas diffusion layers 18 and 22, together with the MEA 26, make up a Membrane-Electrode-Gas Diffusion layer Assembly (MEGA) 28.

The separators 20 and 24 are formed of materials having electron conductivity. Examples of such materials include carbon, resin molded carbon, titanium and stainless steel. These separators 20 and 24 typically have fuel flow channels formed on the gas diffusion layer 18 and 22 sides thereof, which flow channels allow the fuel gas to flow.

FIG. 1 shows only a single MEGA 28 composed as described above, with a pair of separators 20 and 24 disposed on either side thereof. An actual fuel cell has a stacked construction in which a plurality of MEGAs 28 are stacked with separators 20 and 24 therebetween.

Figure 2:
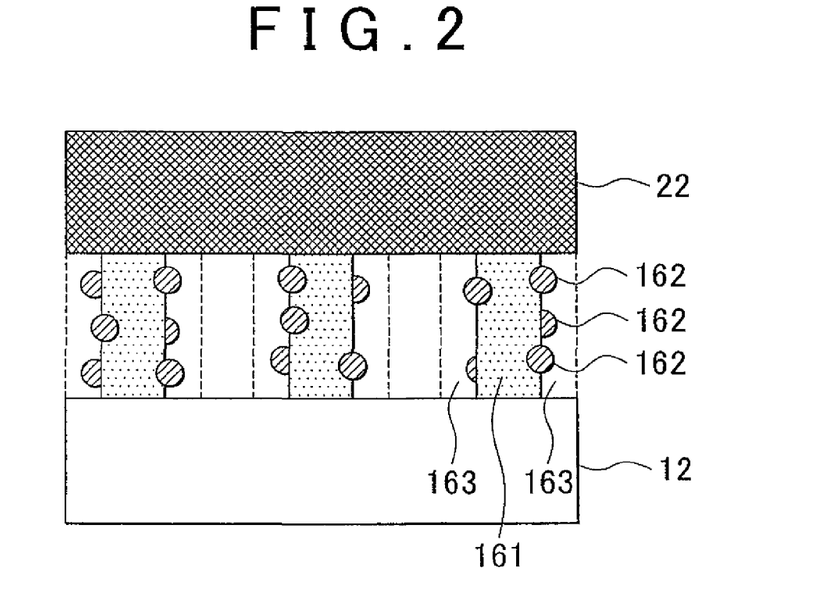
FIG. 2 is an enlarged schematic diagram of a portion of the cathode catalyst layer 16 in FIG. 1.

FIG. 2 is an enlarged schematic diagram of a portion of the cathode catalyst layer 16 in FIG. 1. In the manufacturing method of the present embodiment, a CNT structure similar to that of the cathode catalyst layer 16 is formed at the anode catalyst layer 14 as well. The explanation here is described using the cathode catalyst layer 16.

The cathode catalyst layer 16 includes electrically conductive CNTs 161, each having a hollow space formed at the interior. The hollow space in each CNT 161 is formed substantially perpendicular to the polymer electrolyte membrane 12 by the subsequently described method of manufacture. Because the CNTs 161 are substantially perpendicularly oriented, spaces through which the reactant gas readily diffuses can be secured between mutually adjoining CNTs 161, enabling the diffusivity of the reactant gas to be increased. Moreover, because the CNTs 161 can be made very short in length, the gas transport path in the hollow space can be shortened. Therefore, the diffusivity of reactant gas can be increased even in the hollow space.

As used herein, "substantially perpendicular" refers to an angle between the polymer electrolyte membrane 12 and the lengthwise direction of the tube of 90°±10°. This encompasses cases where, owing to the conditions at the time of manufacture, for example, an angle of 90° is not always achieved. Within a range of 90°±10°, effects similar to those obtained when the CNTs are formed at 90° can be attained. CNTs which are substantially perpendicularly oriented include both CNTs having a shape in the lengthwise direction thereof which is linear, as well as CNTs for which this shape is not linear. In CNTs for which the shape in the lengthwise direction of the tube is not linear, the direction of the straight line connecting the centers of both end faces of the CNT shall be regarded as the lengthwise direction of that nanotube.

As shown in FIG. 2, one end of the CNTs 161 in the tube lengthwise direction is formed as an open end, and the other end is formed as a closed end. Of these, the open end is disposed so as to be in contact with the gas-diffusing layer 22, and the closed end is disposed so as to be in contact with the polymer electrolyte membrane 12.

As shown in FIG. 2, catalyst particles 162 are provided on the outer-surfaces of the CNTs 161. Examples of the catalyst particles 162 include metals such as platinum, ruthenium, iridium, rhodium, palladium, osmium, tungsten, lead, iron, chromium, cobalt, nickel, manganese, vanadium, molybdenum, gallium and aluminum, and alloys thereof. Platinum or an alloy of platinum with another metal such as ruthenium is preferred.

An ionomer 163 is provided so as to cover the catalyst particles 162 on the outer surfaces of the CNTs 161. The ionomer 163 provided on the outer surfaces of mutually adjoining CNTs 161 need not necessarily be in direct mutual contact. In other words, the ionomer 163 need not necessary fill the spaces between mutually adjoining CNTs 161. Examples of preferred ionomers 163 include materials similar to the polymer electrolytes mentioned in connection with the polymer electrolyte membrane 12.

Method of Manufacturing Fuel Cell

Figure 3A:
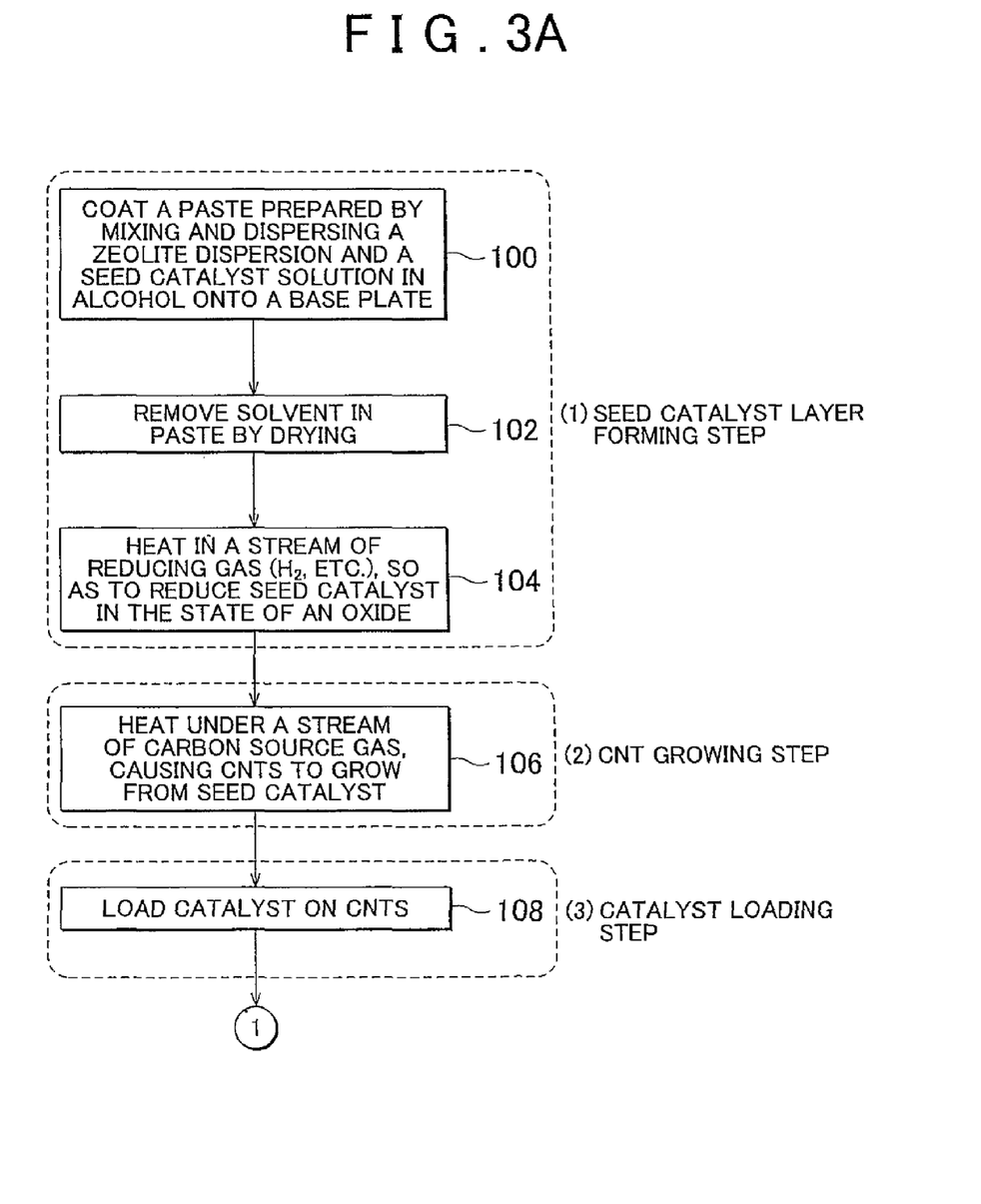
FIGS. 3A and 3B are a flow chart which depicts and contrasts the sequence of operations in the method of manufacture according to the present embodiment with those in a conventional method of manufacture.
Figure 3B:
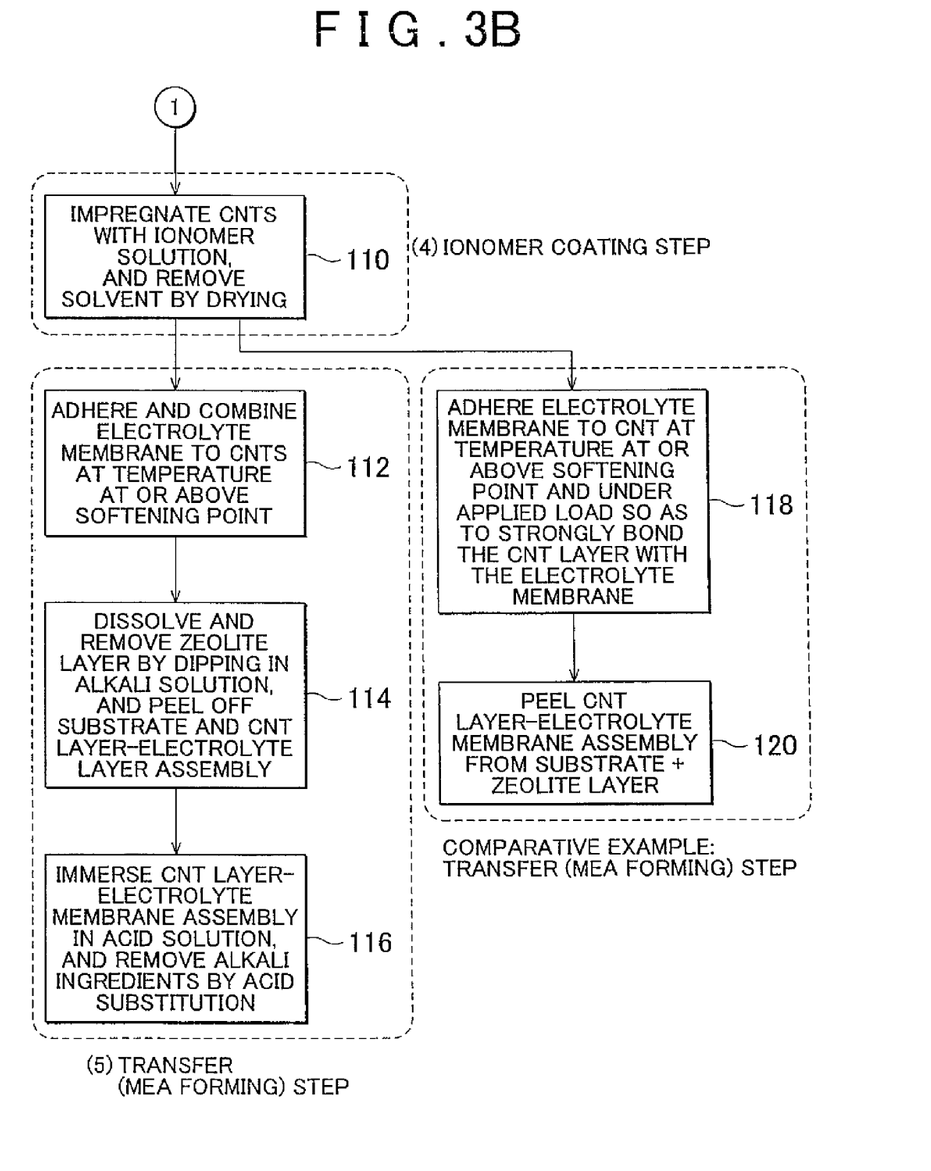

Next, the method of manufacture according to the present embodiment is described in conjunction with FIGS. 3A and 3B. The method of manufacture according to this embodiment includes: (1) a seed catalyst forming step, (2) a CNT forming step, (3) a catalyst loading step, (4) an ionomer coating step, and (5) a transfer step.

(1) Seed Catalyst Layer Forming Step

This is a step in which a layer which loads the seed catalyst is formed on a base plate (Steps 100 to 104). The seed catalyst serves as nuclei for growing CNTs, and are formed of fine metal particles. Examples of seed catalysts that may be used include metals such as iron, nickel, cobalt, manganese, molybdenum and palladium, and alloys thereof. The base plate may be, for example, a silicon base plate, glass base plate, quartz base plate, stainless steel base plate or aluminum base plate. Where necessary, the surface of the base plate is cleaned. Exemplary methods for cleaning the base plate include heat treatment in a vacuum.

In this step, first a solution containing a zeolite dispersion and the seed catalyst metal is prepared. This solution is then mixed and dispersed in an alcohol such as ethanol to form a paste, which is coated onto a base plate (Step 100). In this way, a metal thin-film layer is formed on the base plate. The metal thin-film layer may be formed by a coating process such as spraying, screen printing, a doctor blade method or an inkjet method. When dispersing the zeolite dispersion and the seed catalyst metal in alcohol, it is preferable to effect dispersion by at least 10 minutes of sonication. Thus, the precursor of a substrate is prepared.

Next, the solvent in the paste is removed by drying (Step 102). Specifically, the base plate on which a metal thin-film layer has been formed is dried at 80° C. for 24 hours. In this way, seed catalyst in the state of an oxide and having a particle size of about several nanometers is loaded on the surface of the zeolite layer. More preferably, after the precursor has been dried at 80° C. for 1 hour, it is subjected once again to dispersion for at least 10 minutes by sonication, then is dried at 80° C. for 24 hours. Because a porous zeolite layer can be formed in this way, the seed catalyst loading surface area is increased, enabling a large amount of seed catalyst in the state of an oxide to be loaded. The drying temperature and drying time may be suitably varied according to such factors as the alcohol boiling point and the thickness of the metal thin-film layer.

Next, heating is carried out under a stream of reducing gas, thereby reducing the seed catalyst which is in the state of an oxide (Step 104). Specifically, the temperature of the precursor is raised to about 800° C. in the presence of an inert gas admixed with hydrogen. As explained above, because the zeolite layer is a porous material, it has an increased surface area. For this reason, when the temperature is raised, the seed catalyst can be loaded at a high density without sintering and becoming coarser. It is preferable for the seed catalyst to have a particle size of generally from about 1 nm to about 20 nm.

In order to load seed catalyst having a particle size in this range, it is preferable for the above metal thin-film layer to be set to a thickness of from about 1 nm to about 10 nm. Thus, the substrate including the base plate and the seed catalyst is formed.

(2) CNT Growing Step

This is a step in which the CNTs are oriented in a direction that is substantially perpendicular to the substrate (Step 106). Here, "substantially perpendicular to the substrate" means that the lengthwise direction of the nanotubes is substantially at a right angle to the substrate. In the case of CNTs which have a shape in the tube lengthwise direction that is not linear, the angle between the straight line connecting the centers of both end faces of the CNT and the substrate is used to determine the lengthwise direction of the CNT.

In this step, with the substrate placed in a space having a predetermined temperature suitable for CNT growth (typically about 800° C.) and an inert atmosphere, a precursor gas is supplied to the seed catalyst. In this way, CNTs closed at the distal end grow in a substantially perpendicular direction with respect to the substrate. Because the CNTs closed at the distal end grow starting at the seed catalyst loaded on the surface of the zeolite layer, they form to a high density. Examples of gases that may be used as the precursor gas supplied in this step include carbon-based gases such as methane, ethylene, acetylene, benzene and alcohol.

The flow rate, feed period and total feed amount of the precursor gas are not subject to any particular limitation, although these may be set as appropriate based on such considerations as the tube length, tube diameter and amorphous layer thickness of the CNTs. For example, the thickness of the amorphous layer and the length of the CNTs which grow can be designed based on the concentration of the precursor gas supplied (precursor gas flow rate/(precursor gas flow rate+ inert gas flow rate)). That is, the higher the concentration of the precursor gas supplied, the thicker the amorphous layer can be made and the longer the length to which the CNTs can be grown.

Also, this step uses a Chemical Vapor Deposition (CVD) process to form the CNTs by making both the seed catalyst and the precursor gas present together under high-temperature conditions. However, the process of forming CNTs is not limited to a CVD process. For example, formation may be carried out using a vapor-phase growth process such as an arc discharge process or a laser vapor deposition process, or some other conventional method of synthesis.

(3) Catalyst Supporting Step

This is a step in which catalyst particles (electrode catalysts) are loaded on the CNTs (Step 108). The method of loading catalyst particles in this step is not subject to any particular limitation, and may be carried out by any suitable wet process or dry process. Wet processes are exemplified by methods in which a metal salt-containing solution is coated onto the surface of CNTs, followed by heating to at least 200° C. in a hydrogen atmosphere so as to effect reduction. The metal salt is exemplified by metal halides, metal acid halides, inorganic acid salts of metals, organic acid salts of metals and metal complex salts, wherein the metal is any of those listed above in connection with the catalyst particles. The solution containing such metal salts may be an aqueous solution or an organic solvent solution. Examples of methods for coating the metal salt solution onto the surface of the CNTs include methods in which the CNTs are dipped in a metal salt solution, methods in which the metal salt solution is added dropwise to the surface of the CNTs, and methods in which the metal salt solution is sprayed onto the surface of the CNTs.

For example, in cases where platinum is used as the catalyst, a platinum salt solution obtained by dissolving a suitable amount of chloroplatinic acid or a platinum nitrate solution (e.g., a nitric acid solution of dinitro diamine platinum) in an alcohol such as ethanol or isopropanol may be used as the wet process. The use of a platinum salt solution obtained by dissolving in alcohol a dinitrodiamine solution of platinum nitrate is preferred because the platinum can be uniformly loaded on the surface of the CNTs. Examples of dry processes include electron beam vapor deposition, sputtering, and electrostatic coating.

(4) Ionomer Coating Step

This is a step in which an ionomer is coated onto the surface of the CNTs on which the catalyst has been loaded (Step 110). This step is carried out by (i) dipping the CNTs in an ionomer solution, then uniformly impregnating the nanotubes with the ionomer solution by vacuum degassing, and subsequently (ii) vacuum drying to remove the solvent. By repeatedly carrying (i) and (ii), it is possible to support the desired amount of ionomer on the CNTs. By supporting the desired amount of ionomer, spaces can be formed between mutually adjoining CNTs.

Coating of the ionomer is not limited to the above method. That is, a solution obtained by dispersing or dissolving the ionomer may be coated onto the CNT surface by, for example, a sprayer, a die coater, a dispenser or screen printing, followed by drying. Alternatively, as mentioned above, the ionomer may be supported on the CNT surface by coating or application in some other way in the state of a polymer, or may be supported on the CNT surface by applying a polymerization composition which includes a precursor of the ionomer and optional additives such as various types of polymeric initiators to the surface of the CNTs, drying if necessary, then exposure to radiation such as ultraviolet light or heating to effect polymerization.

(5) Transfer Step

This is a step in which the ionomer-coated CNTs are transferred (e.g., hot-pressed) to a polymer electrolyte membrane (Steps 112 to 116). In this step, first the polymer electrolyte membrane is made to adhere to the CNTs at a temperature at or above the softening point (Step 112). In this way, a substrate-CNT layer-electrolyte membrane assembly can be fabricated. The polymer electrolyte membrane that is made to adhere is heated to at least the softening point of the membrane used. However, to keep membrane deterioration or a decrease in proton conductivity from occurring, the membrane is not heated to an excessive temperature. For example, in cases where a perfluorocarbon sulfonic acid resin is used as the polymer electrolyte membrane, adherence is effected by heating at from 100° C. to 160° C. When the polymer electrolyte membrane and the CNTs are combined together, a lower limit pressure may be applied so as to achieve good adherence of the polymer electrolyte membrane to the CNTs.

Next, the substrate-CNT layer-electrolyte membrane assembly is immersed in an alkali solution (Step 114). This dissolves and removes the zeolite layer or seed catalyst that was formed on the base plate. Or it dissolves and removes the zeolite layer together with the seed catalyst. In this way, points of contact between the zeolite layer and/or seed catalyst and the CNTs are removed, thereby separating the substrate and the CNT layer-electrolyte membrane assembly. In particular, the zeolite layer need not be entirely dissolved. That is, if only the surfacemost portion where points of contact with the CNTs have been formed can be dissolved and removed, then the substrate and the CNT layer-electrolyte membrane assembly can be separated. The alkali solution is not subject to any particular limitation, provided it contains a solvent capable of dissolving zeolite or the seed catalyst. For example, zeolite can be dissolved with an aqueous solution of an alkali compound such as sodium hydroxide or calcium hydroxide, an aqueous solution of an alkylamine such as trimethylamine or triethylamine, an aqueous solution of ammonia, or an aqueous solution of ammonium fluoride. Aqueous solutions of the above alkali compounds are capable of dissolving aluminum-based and zinc-based seed catalysts. The solution concentration may be suitably varied in order to carry out dissolution and removal in a short time. Moreover, it is advantageous to promote dissolution by suitably varying the method of immersion (sonication, stirring, heating).

Next, the CNT layer-electrolyte membrane assembly is immersed in an acid solution (Step 116). This neutralizes and removes the alkali ingredients that were used in the Step 114. The acid solution most suitable for the alkali used in Step 114 may be selected. The foregoing steps enable a MEA wherein an electrode layer has been formed with the CNT layer to be fabricated. By sandwiching this MEA between the above-described gas diffusion layers and separators, a fuel cell can be manufactured.

For the sake of comparison with above Steps 112 to 116, FIG. 3B also briefly describes the transfer step in an example according to the comparative example (Steps 118 and 120). In the transfer step in this comparative example, CNTs and a polymer electrolyte membrane are strongly combined by applying a load to the CNTs while heating the polymer electrolyte membrane to a temperature at or above the softening point (Step 118). In this way, a substrate-CNT layer-electrolyte membrane assembly is created. The substrate is then peeled, together with the zeolite layer, from the CNT layer-electrolyte membrane assembly (Step 120).

Here, the reason for applying a load to the CNTs in Step 118 is to avoid having the CNTs peel off together with the substrate during peeling of the substrate in Step 120. Hence, in Step 118, a load is applied in such a way as to satisfy the relationship: adherence between CNT layer and electrolyte membrane>adherence between zeolite layer and CNT layer. However, the seed catalyst, by passing through the heating and reduction operation of Step 104, has been made to adhere strongly to the zeolite layer. In addition, because the seed catalyst has a structure anchored in fine pores in the surface of the zeolite layer, the adherence between the zeolite layer and the CNT layer is very high. Therefore, to satisfy the above relationship, it has been necessary for the CNT layer and the electrolyte membrane to adhere more strongly; that is, there has been a need for the CNT layer and the electrolyte membrane tote bonded by fully applying a load. Moreover, as already mentioned, the possibility has existed of this leading to the penetration of the electrolyte membrane by the CNTs.

As explained above, with the manufacturing method shown in FIGS. 3A and 3B, the zeolite layer or seed catalyst formed on the base plate can be dissolved and removed. Alternatively, the zeolite layer can be dissolved and removed together with the seed catalyst. Consequently, during the transfer step, CNTs are not separated from the polymer electrolyte membrane together with the substrate. Moreover, because it is no longer necessary to apply pressure in order to have the CNTs embed in the polymer electrolyte membrane, CNT penetration, which is a cause of electrical shorts and leaks in the MEA can be prevented. Furthermore, no peel-off by some of the CNTs, with catalyst particles still loaded thereon, that have formed on the substrate occurs when the substrate is peeled off. Therefore, at the time of fuel cell manufacture, loss of starting materials due to the peel-off of catalyst particles can be suppressed. At the same time, the CNT-loaded catalyst that has formed inside the zeolite layer can be effectively utilized.

Also, in the manufacturing method shown in FIGS. 3A and 3B, by immersing the zeolite layer in an acid solution after it has been immersed in an alkali solution, the alkali ingredients can be neutralized and, at the same time, the polymer electrolyte membrane can be rendered into an active state. Generally, the polymer electrolyte membrane is formed from a polymer having strongly acidic groups such as sulfonic acid groups on side chains. For this reason, the activity of these strongly acid groups can be restored by immersion in an acid solution.

In the above-described first embodiment, the base plate and the zeolite layer may be regarded as the "base material" of the invention, and the combination of the base plate, the zeolite layer and the growth catalyst loaded on the zeolite layer may be regarded as the "substrate."

In this embodiment, a porous zeolite layer was provided on the base plate. However, instead of the porous zeolite layer, another layer which is capable of loading the seed catalyst and which can be dissolved and removed with an acid solution or an alkali solution may be provided. For example, a layer of another porous ceramic material, a layer of elemental metal, or a layer of a porous metal material may be provided. Because other porous ceramic materials, like porous zeolite, are able to load the seed catalyst at a high density, they enable CNTs to be formed to a high density. Examples of other porous ceramic materials include silica, titania and zirconia. Such other porous ceramic materials can generally be synthesized using a sol-gel process. Of these, because silica is soluble in hot alkali and hydrofluoric acid, titania is soluble in alkali, and zirconia is soluble in hot sulfuric acid, hot phosphoric acid and hydrofluoric acid, these are capable of being dissolved and removed. Examples of elemental metals include iron, copper, nickel, chromium, aluminum and zinc. From the standpoint of the cost, iron and aluminum are preferred as elemental metals. Exemplary porous metal materials include sintered bodies, foamed bodies, and fibrous bodies or the like. The sintered bodies is obtained by bonding a pressed compact of the above-mentioned metal at a high temperature. The foamed bodies is obtained by melting any of these metals, foaming the molten metal such as by adding a blowing agent, then solidifying the metal. The fibrous bodies is obtained by plating a nonwoven fabric created from fine fibers of nylon or the like, sintering, then removal of the fibers. In cases where a layer of porous metal material is used, as with porous zeolite, the seed catalyst can be loaded at a high density, enabling CNTs to be formed to a high density. These metals may be, basically, dissolved and removed with an acid solution. Aluminum and zinc may be dissolved and removed with an alkali solution.

Also, in the present embodiment, the seed catalyst was loaded by providing a zeolite layer on the base plate. However, the seed catalyst may instead be loaded directly on the base plate without providing a zeolite layer. Specifically, in Step 100 shown in FIG. 3A, it is possible to mix and disperse the seed catalyst metal alone in alcohol to form a paste, and to then coat the paste onto the base plate. In this variation, the peelability does not worsen due to the anchoring effect of the CNTs within the zeolite layer. However, when the seed catalyst has been reduced under heating, because the fine metal particles fuse with the base plate and firmly bond thereto, stronger bonding between the CNT layer and the electrolyte membrane is required. Hence, it is necessary to combine the CNT layer to the electrolyte membrane by fully applying a load thereto, as a result of which electrical shorting or leaks may arise in the MEA. In this variation, the seed catalyst metal which has been loaded on the base plate is dissolved and removed by immersing the base plate in an acid solution. The seed catalyst is the starting point of CNT growth and at the same time is the point of contact with the base plate. Therefore, by dissolving and removing the seed catalyst, the substrate-CNT layer can be easily peeled off. The acid solution used to dissolve the seed catalyst is preferably sulfuric acid, the reasons being that sulfuric acid does not poison the fuel cell catalyst and has acidic groups similar to the acidic groups within the fuel cell. In this variation, the base plate may be regarded as the "base material" of the invention, and the base plate and the growth catalyst which has been loaded on the base plate may be regarded as the "substrate" of the invention.

Second Embodiment

The manufacturing method according to this embodiment provides, in the seed catalyst layer forming step (1) of the first embodiment, a layer made of another material between the base plate and the zeolite layer. Because this manufacturing method is otherwise-identical to the first embodiment, a detailed description of the remainder of this manufacturing method is omitted below.

Although zeolite is soluble in alkali, it is only sparingly soluble. Therefore, in the present embodiment, a layer of another material which dissolves more readily in alkali or acid than zeolite is provided as a layer to the inside of the zeolite layer (on the side opposite the surface of the zeolite layer where the CNTs are provided). As described above, because the zeolite layer is a porous material, the acid or alkali solution can be made to pass through the pores therein and penetrate to the inside layer. If the inside layer to which the solution has penetrated dissolves in alkali or acid more easily than zeolite, the dissolution rate can be elevated compared to cases in which a zeolite layer alone has been formed on the base plate. Therefore, the lead time at the time of substrate peeling can be shortened, enabling the fuel cell manufacturability to be enhanced. The inside layer may be either a single layer or two or more layers.

Other materials having the quality of dissolving in alkali or acid more readily than zeolite are not subject to any particular limitation, provided that are soluble in alkali or acid. Specific examples of such other materials include the metal porous metal materials and porous ceramic materials listed above in the description of the first embodiment.

In cases where such a layer formed of another material is provided, the layer in contact with the zeolite layer is preferably a layer composed of a porous ceramic material or a porous metal material. In cases where it is composed of a porous ceramic material or a porous metal material, the acid or alkali solution can be made to pass through the pores therein and penetrate to the inside layer. The dissolution rate of the layer in contact with the zeolite layer can thus be increased, which is desirable.

However, when CNTs are grown, these layers are heated to a high temperature (generally, about 800° C.). For this reason, when metal is used in the layer formed of another material, peeling between the other material layer and the zeolite layer readily occurs due to a difference in thermal expansion therebetween. Therefore, it is preferable to use a porous ceramic material in the layer formed of another material. By using a porous ceramic material, the thermal expansion difference with the zeolite can be made small.

In the above-described second embodiment, the base plate, the layer formed of the other material and the zeolite layer may be regarded as the "base material" of the invention.

Also, in this embodiment, the surfacemost layer is a layer of porous zeolite, although it may instead be a layer of the above-mentioned other porous ceramic material or porous metal material. In cases where it is a layer of another porous ceramic material or a porous metal material, an acid or alkali solution can be made to pass through the pores therein and penetrate to the inside layer. Therefore, if the layer on the inner side dissolves more easily than the porous ceramic material or the porous metal material, the dissolution rate can be increased compared with a case in which a layer of porous ceramic material or a layer of porous metal material alone has been formed on the base plate.

The invention claimed is:

1. A method of manufacturing a fuel cell, comprising:
    growing carbon nanotubes substantially perpendicular to a substrate formed by loading a growth catalyst on a base material;
    arranging the substrate and a polymer electrolyte membrane so as to oppose to each other and combining the carbon nanotubes with the polymer electrolyte membrane; and
    dissolving and removing part of the substrate by immersing the substrate in an alkali solution, after the carbon nanotubes and the polymer electrolyte membrane are combined, wherein
    the base material is composed of a plurality of layers,
    of the plurality of layers, a surface layer which is located on a side where carbon nanotubes are grown, is formed of zeolite, and
    a layer which is located inside of the surface layer is formed of at least one material selected from the group consisting of silica, titania, aluminum, and zinc.

2. The method according to claim 1, wherein after a part of the substrate is dissolved and removed by immersing the substrate in the alkali solution, an assembly of the carbon nanotubes and the polymer electrolyte membrane is immersed in an acid solution.

3. The method according to claim 1, further comprising:
    loading electrode catalysts on the grown carbon nanotubes; and
    coating an ionomer onto the carbon nanotubes on which the electrode catalysts are loaded.

4. The method according to claim 1, wherein the layer which is located inside of the surface layer has a higher solubility to an alkali solution than the surface layer.

5. The method according to claim 1, wherein the layer which is located inside of the surface layer is formed of a layer having a higher solubility to an alkali solution than zeolite.

6. The method according to claim 1, wherein the surface layer is a plate shape.

* * * * *